United States Patent
Perez et al.

(10) Patent No.: US 11,613,636 B2
(45) Date of Patent: Mar. 28, 2023

(54) POLYMER BLENDS FOR USE IN MULTILAYER STRUCTURE AND MULTILAYER STRUCTURES COMPRISING THE SAME

(71) Applicant: Dow Global Technologies LLC, Midland, MI (US)

(72) Inventors: Carmelo Declet Perez, Pearland, TX (US); Brian W. Walther, Freeport, TX (US); James L. Cooper, Brazoria, TX (US); Michael B. Biscoglio, Blue Bell, PA (US); John A. Naumovitz, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 201 days.

(21) Appl. No.: 15/768,384

(22) PCT Filed: Nov. 18, 2016

(86) PCT No.: PCT/US2016/062729
§ 371 (c)(1),
(2) Date: Apr. 13, 2018

(87) PCT Pub. No.: WO2017/087776
PCT Pub. Date: May 26, 2017

(65) Prior Publication Data
US 2018/0304602 A1    Oct. 25, 2018

Related U.S. Application Data

(60) Provisional application No. 62/257,383, filed on Nov. 19, 2015.

(51) Int. Cl.
| C08L 23/08 | (2006.01) |
| B32B 7/12 | (2006.01) |
| B32B 15/082 | (2006.01) |
| B32B 27/30 | (2006.01) |
| C08F 10/02 | (2006.01) |
| C08F 10/06 | (2006.01) |
| C08F 210/02 | (2006.01) |

(52) U.S. Cl.
CPC ............ C08L 23/0815 (2013.01); B32B 7/12 (2013.01); B32B 15/082 (2013.01); B32B 27/308 (2013.01); C08F 10/02 (2013.01); C08F 10/06 (2013.01); C08F 210/02 (2013.01); C08F 2500/07 (2013.01); C08F 2500/08 (2013.01); C08F 2500/12 (2013.01); C08F 2500/17 (2013.01); C08L 2203/16 (2013.01)

(58) Field of Classification Search
CPC ....... B32B 27/308; B32B 7/12; B32B 15/082; C08F 220/18; C08F 10/06; C08F 210/02; C08F 10/02; C08F 2500/17; C08F 2500/08; C08F 2500/07; C08F 2500/12; C08L 23/0815; C08L 33/08; C08L 33/10; C08L 67/00; C08L 2203/16
See application file for complete search history.

(56) References Cited

U.S. PATENT DOCUMENTS

| 3,645,992 A | 2/1972 | Dow |
| 3,914,342 A | 10/1975 | Mitchell |
| 4,076,698 A | 2/1978 | Anderson et al. |
| 4,302,557 A | 11/1981 | Yoshimura et al. |
| 4,599,392 A | 7/1986 | McKinney et al. |
| 4,678,836 A | 7/1987 | McKinney et al. |
| 4,751,262 A | 6/1988 | McKinney et al. |
| 4,897,437 A | 1/1990 | McKinney et al. |
| 5,272,236 A | 12/1993 | Lai et al. |
| 5,278,272 A | 1/1994 | Lai et al. |
| 5,395,471 A | 3/1995 | Obijeski et al. |
| 5,574,108 A | 11/1996 | Antonov et al. |
| 5,582,923 A | 12/1996 | Kale et al. |
| 5,733,155 A | 3/1998 | Sagawa et al. |
| 5,854,045 A | 12/1998 | Fang et al. |
| 6,437,046 B1 | 8/2002 | Morris |
| 6,835,269 B1 | 12/2004 | Miharu et al. |
| 6,903,161 B2 | 6/2005 | Morris |
| 8,541,073 B2 | 9/2013 | Kendig et al. |
| 8,609,777 B2 | 12/2013 | Prejean et al. |
| 8,680,197 B2 | 3/2014 | Strzegowski et al. |
| 8,916,642 B2 | 12/2014 | Corfias-Zuccalli et al. |
| 8,962,971 B2 | 2/2015 | Wu et al. |
| 2008/0163978 A1 | 7/2008 | Botros |
| 2008/0196760 A1 | 8/2008 | Hayes et al. |
| 2010/0120313 A1 | 5/2010 | Bohme et al. |
| 2013/0164552 A1* | 6/2013 | Wang ............ C08L 23/06 428/523 |
| 2014/0262426 A1* | 9/2014 | Hatlewick .......... C09J 7/29 174/110 R |

FOREIGN PATENT DOCUMENTS

| EP | 0997494 A1 | 5/2000 |
| EP | 1002016 B1 | 2/2005 |

(Continued)

OTHER PUBLICATIONS

Cho, Journal of Adhesion Science and Technology, 1997, vol. 11, p. 433-445.

(Continued)

Primary Examiner — Samir Shah

(57) ABSTRACT

The present invention provides polymer blends that can be used in a multilayer structure and to multilayer structures including one or more layers formed from such blends. In one aspect, a polymer blend includes a copolymer including ethylene and at least one of acrylic acid and methacrylic acid having an acid content greater than 4 and up to 25 weight percent based on the weight of the copolymer and having a melt index ($I_2$) of 1 to 60 g/10 minutes, wherein the total amount of ethylene acrylic acid copolymer and ethylene methacrylic acid copolymer includes 45 to 99 weight percent of the blend based on the total weight of the blend, and a polyolefin having a density of 0.870 g/cm$^3$ or more and having a melt index ($I_2$) of 20 g/10 minutes or less, wherein the polyolefin includes 1 to 55 weight percent of the blend based on the total weight of the blend.

12 Claims, No Drawings

(56) References Cited

FOREIGN PATENT DOCUMENTS

| | | | |
|---|---|---|---|
| EP | 1854626 | B1 | 9/2009 |
| EP | 1907206 | B1 | 11/2012 |
| JP | S62197435 | A | 9/1987 |
| JP | H03239741 | A | 10/1991 |
| JP | H05031850 | A | 2/1993 |
| JP | H06032949 | A | 2/1994 |
| JP | 3351842 | B2 | 12/2002 |
| JP | 2008063539 | A | 3/2008 |
| JP | 4775992 | B2 | 9/2011 |
| JP | 4778283 | B2 | 9/2011 |
| WO | 2001012437 | A1 | 2/2001 |
| WO | 2007/012805 | A1 | 2/2007 |
| WO | 2009/135098 | A1 | 11/2009 |
| WO | 2013/048689 | A2 | 4/2013 |

OTHER PUBLICATIONS

Filippi, Macromolecular Chemistry and Physics, 2002, vol. 203, p. 1512-1525.
PCT/US2016/062729, International Search Report and Written Opinion dated Jan. 23, 2017.
PCT/US2016/062729, International Preliminary Report on Patentability dated May 31, 2018.

\* cited by examiner

POLYMER BLENDS FOR USE IN MULTILAYER STRUCTURE AND MULTILAYER STRUCTURES COMPRISING THE SAME

FIELD

The present invention relates to polymer blends that can be used in a multilayer structure and to multilayer structures comprising one or more layers formed from such polymer blends.

INTRODUCTION

Ethylene acrylic acid copolymers ("EAA"), such as those available from The Dow Chemical Company under the name PRIMACOR™ provide excellent adhesion to metal substrates such as aluminum. For this reason, EAA resins are typically used as tie layers for aluminum foil in multilayer packaging structures. Despite the usefulness of EAA resins in tie layers, in some instances, the EAA in a tie layer can contribute negatively to the temperature sensitivity of the tie layer. Thus, there remains a need for alternative approaches for polymers that can provide desirable adhesion to foil, metallized film, or similar substrates in multilayer structures while minimizing undesirable effects.

SUMMARY

The present invention provides polymer blends that in some aspects provide desirable adhesion when used as a tie layer in a multilayer structure while reducing the amount of ethylene acrylic acid in the tie layer. Further, in some aspects, the present invention facilitates extrusion coating to form multilayer structures while minimizing undesirable effects such as draw down and neck-in. For example, embodiments of the present invention comprise a carefully selected blend of resins that incorporates enough ethylene acrylic acid (or similar polymeric resin) to achieve desirable adhesion.

In one aspect, the present invention provides a polymer blend that comprises a copolymer comprising ethylene and at least one of acrylic acid and methacrylic acid having an acid content greater than 4 and up to 25 weight percent based on the weight of the copolymer and having a melt index ($I_2$) of 1 to 60 g/10 minutes, wherein the total amount of ethylene acrylic acid copolymer and ethylene methacrylic acid copolymer comprises 45 to 99 weight percent of the blend based on the total weight of the blend; and a polyolefin having a density of 0.870 g/cm$^3$ or more and having a melt index ($I_2$) of 20 g/10 minutes or less, wherein the polyolefin comprises 1 to 55 weight percent of the blend based on the total weight of the blend.

In another aspect, the present invention provides a polymer blend that comprises a copolymer comprising ethylene and at least one of acrylic acid and methacrylic acid having an acid content greater than 4 and up to 25 weight percent based on the weight of the copolymer and having a melt index ($I_2$) of 1 to 60 g/10 minutes, wherein the total amount of ethylene acrylic acid copolymer and ethylene methacrylic acid copolymer comprises 45 to 99 weight percent of the blend based on the total weight of the blend, and a polyethylene comprising low density polyethylene or linear low density polyethylene and having a melt index ($I_2$) of 10 g/10 minutes or less, wherein the polyethylene comprises 15 to 55 weight percent of the blend based on the total weight of the blend, wherein the relative viscosity ratio of the polyethylene to the ethylene/(meth)acrylic acid copolymer is <0.15.

In another aspect, the present invention provides a multilayer structure comprising at least two layers, each layer having opposing facial surfaces, wherein Layer A comprises any of the polymer blends of the present invention disclosed herein, and wherein Layer B comprises a substrate, wherein a top facial surface of Layer B is in adhering contact with a bottom facial surface of Layer A. In some embodiments, the substrate comprises aluminum foil.

These and other embodiments are described in more detail in the Detailed Description.

DETAILED DESCRIPTION

Unless stated to the contrary, implicit from the context, or customary in the art, all parts and percents are based on weight, all temperatures are in ° C., and all test methods are current as of the filing date of this disclosure.

The term "composition," as used herein, refers to a mixture of materials which comprises the composition, as well as reaction products and decomposition products formed from the materials of the composition.

"Polymer" means a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), and the term interpolymer as defined hereinafter. Trace amounts of impurities (for example, catalyst residues) may be incorporated into and/or within the polymer. A polymer may be a single polymer, a polymer blend or polymer mixture.

The term "interpolymer," as used herein, refers to polymers prepared by the polymerization of at least two different types of monomers. The generic term interpolymer thus includes copolymers (employed to refer to polymers prepared from two different types of monomers), and polymers prepared from more than two different types of monomers.

The terms "olefin-based polymer" or "polyolefin", as used herein, refer to a polymer that comprises, in polymerized form, a majority amount of olefin monomer, for example ethylene or propylene (based on the weight of the polymer), and optionally may comprise one or more comonomers.

"Polypropylene" means a polymer having greater than 50 wt % units derived from propylene monomer.

The term, "ethylene/α-olefin interpolymer," as used herein, refers to an interpolymer that comprises, in polymerized form, a majority amount of ethylene monomer (based on the weight of the interpolymer), and a α-olefin.

The term, "ethylene/α-olefin copolymer," as used herein, refers to a copolymer that comprises, in polymerized form, a majority amount of ethylene monomer (based on the weight of the copolymer), and a α-olefin, as the only two monomer types.

The term "in adhering contact" and like terms mean that one facial surface of one layer and one facial surface of another layer are in touching and binding contact to one another such that one layer cannot be removed from the other layer without damage to the interlayer surfaces (i.e., the in-contact facial surfaces) of both layers.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

"Polyethylene" or "ethylene-based polymer" shall mean polymers comprising greater than 50% by weight of units which have been derived from ethylene monomer. This includes polyethylene homopolymers or copolymers (meaning units derived from two or more comonomers). Common forms of polyethylene known in the art include Low Density Polyethylene (LDPE); Linear Low Density Polyethylene (LLDPE); Ultra Low Density Polyethylene (ULDPE); Very Low Density Polyethylene (VLDPE); single-site catalyzed Linear Low Density Polyethylene, including both linear and substantially linear low density resins (m-LLDPE); Medium Density Polyethylene (MDPE); and High Density Polyethylene (HDPE). These polyethylene materials are generally known in the art; however, the following descriptions may be helpful in understanding the differences between some of these different polyethylene resins.

The term "LDPE" may also be referred to as "high pressure ethylene polymer" or "highly branched polyethylene" and is defined to mean that the polymer is partly or entirely homopolymerized or copolymerized in autoclave or tubular reactors at pressures above 14,500 psi (100 MPa) with the use of free-radical initiators, such as peroxides (see for example U.S. Pat. No. 4,599,392, which is hereby incorporated by reference). LDPE resins typically have a density in the range of 0.916 to 0.935 g/cm$^3$.

The term "LLDPE", includes both resin made using the traditional Ziegler-Natta catalyst systems as well as single-site catalysts, including, but not limited to, bis-metallocene catalysts (sometimes referred to as "m-LLDPE") and constrained geometry catalysts, and includes linear, substantially linear or heterogeneous polyethylene copolymers or homopolymers. LLDPEs contain less long chain branching than LDPEs and includes the substantially linear ethylene polymers which are further defined in U.S. Pat. Nos. 5,272,236, 5,278,272, 5,582,923 and 5,733,155; the homogeneously branched linear ethylene polymer compositions such as those in U.S. Pat. No. 3,645,992; the heterogeneously branched ethylene polymers such as those prepared according to the process disclosed in U.S. Pat. No. 4,076,698; and/or blends thereof (such as those disclosed in U.S. Pat. Nos. 3,914,342 or 5,854,045). The LLDPEs can be made via gas-phase, solution-phase or slurry polymerization or any combination thereof, using any type of reactor or reactor configuration known in the art.

The term "MDPE" refers to polyethylenes having densities from 0.926 to 0.935 g/cm$^3$. "MDPE" is typically made using chromium or Ziegler-Natta catalysts or using single-site catalysts including, but not limited to, bis-metallocene catalysts and constrained geometry catalysts, and typically have a molecular weight distribution ("MWD") greater than 2.5.

The term "HDPE" refers to polyethylenes having densities greater than about 0.935 g/cm$^3$, which are generally prepared with Ziegler-Natta catalysts, chrome catalysts or single-site catalysts including, but not limited to, bis-metallocene catalysts and constrained geometry catalysts.

The term "ULDPE" refers to polyethylenes having densities of 0.880 to 0.912 g/cm$^3$, which are generally prepared with Ziegler-Natta catalysts, chrome catalysts, or single-site catalysts including, but not limited to, bis-metallocene catalysts and constrained geometry catalysts.

The term "multilayer structure" refers to any structure comprising two or more layers having different compositions and includes, without limitation, multilayer films, multilayer sheets, laminated films, multilayer rigid containers, multilayer pipes, and multilayer coated substrates.

Unless otherwise indicated herein, the following analytical methods are used in the describing aspects of the present invention:

"Density" is determined in accordance with ASTM D792.

"Melt index": Melt indices $I_2$ (or I2) and $I_{10}$ (or I10) are measured in accordance with ASTM D-1238 at 190° C. and at 2.16 kg and 10 kg load, respectively. Their values are reported in g/10 min. "Melt flow rate" is used for polypropylene based resins and determined according to ASTM D1238 (230° C. at 2.16 kg).

"Acid content": The acid content of ethylene/(meth) acrylic acid copolymers is measured in accordance with ASTM D4094.

"Adhesion to metal substrate": The adhesion of a layer to metal substrate is determined using a 180 degree peel test based on ASTM F904 with a crosshead speed (as specified) of 3 inches/minute or 10 inches/minute. When characterizing the adhesion of a layer formed from a polymer blend to a metal substrate, the sample comprising the polymer blend layer and metal substrate is prepared and tested as described in the Examples.

"Viscosity at 190° C. and 1000 s$^{-1}$": A Rheotester 2000 capillary rheometer with a stainless steel, flat entrance die of 1 mm diameter and 20 mm length (L/D ratio of 20) is used to generate the flow curve of a polymer. Tests are performed at 190° C. Apparent shear rates are specified from 150 to 10000 s$^{-1}$ and 5 logarithmically spaced points are collected per decade. The resin is packed into a 15 mm diameter barrel and allowed to melt for 10 min prior to the test. A rod can be used as a stopper at the bottom of the capillary during the soak time to avoid dripping of the material from the reservoir. The speed of the piston is controlled to achieve the specified apparent shear rates. The flowing molten polymer is allowed to reach equilibrium at each imposed shear rate before taking the corresponding measurement. As known to those of skill in the art, the apparent shear rate and the shear stress at the wall are calculated based on the dimensions of the capillary, the pressure drop across the capillary, and the speed of the piston. The corrected shear viscosity of the resin is calculated by taking the ratio of the shear stress at the wall to the corrected shear rate. The corrected shear rate is obtained by applying the Weissenberg-Rabinowitsch correction. The Bagley correction was not applied to this calculation. The viscosity of the polymer at 190° C. and a corrected shear rate of 1000 s$^{-1}$ is determined using a linear interpolation process. The logarithm of the corrected shear viscosity and the logarithm of the corrected shear rate are taken for the closest point below and the closest point above a corrected shear rate of 1000 s$^{-1}$. The slope and intercept of a line passing through these two points is calculated to obtain an equation expressing the logarithm of the corrected shear viscosity as a function of the logarithm of the corrected shear rate. This equation is used to determine the value of the logarithm of the corrected shear viscosity at a value of the logarithm of the corrected shear rate equal to 3 ($\log_{10}$ of 1000). The interpolated shear viscosity value at a corrected shear rate of 1000 s$^{-1}$ is finally calculated by taking the antilog of the logarithm of the corrected shear viscosity.

Additional properties and test methods are described further herein.

In one aspect, the present invention provides a polymer blend that comprises a copolymer comprising ethylene and at least one of acrylic acid and methacrylic acid having an acid content greater than 4 and up to 25 weight percent based on the weight of the copolymer and having a melt index ($I_2$) of 1 to 60 g/10 minutes, wherein the total amount of ethylene acrylic acid copolymer and ethylene methacrylic acid copolymer comprises 45 to 99 weight percent of the blend based on the total weight of the blend, and a polyolefin having a density of 0.870 g/cm$^3$ or more and having a melt index ($I_2$) of 20 g/10 minutes or less, wherein the polyolefin comprises 1 to 55 weight percent of the blend based on the total weight of the blend. In some embodiments, the polyolefin comprises linear low density polyethylene, low density polyethylene, high density polyethylene, medium density polyethylene, polyolefin plastomer, polyolefin elastomer, polypropylene, ethylene/cyclic olefin copolymer, or a combination thereof. The polyolefin comprises low density polyethylene or linear low density polyethylene in some embodiments. In some embodiments, instead of, or in addition to polyolefin, the polymer blend further comprises polystyrene.

In another aspect, the present invention provides a polymer blend that comprises a copolymer comprising ethylene and at least one of acrylic acid and methacrylic acid having an acid content greater than 4 and up to 25 weight percent based on the weight of the copolymer and having a melt index ($I_2$) of 1 to 60 g/10 minutes, wherein the total amount of ethylene acrylic acid copolymer and ethylene methacrylic acid copolymer comprises 45 to 99 weight percent of the blend based on the total weight of the blend, and a polyethylene comprising low density polyethylene or linear low density polyethylene and having a melt index ($I_2$) of 10 g/10 minutes or less, wherein the polyethylene comprises 15 to 55 weight percent of the blend based on the total weight of the blend, wherein the relative viscosity ratio of the polyethylene to the ethylene/(meth)acrylic acid copolymer is <0.15.

In some embodiments, the total amount of ethylene acrylic acid copolymer and ethylene methacrylic acid copolymer comprises greater than 50 weight percent of the blend, and the polyolefin comprises less than 50 weight percent of the blend. The total amount of ethylene acrylic acid copolymer and ethylene methacrylic acid copolymer comprises greater than 55 weight percent of the blend, and the polyolefin comprises less than 45 weight percent of the blend in some embodiments.

In some embodiments, the relative viscosity ratio of the polyolefin to the ethylene/(meth)acrylic acid copolymer in the polymer blend is <0.15, and <0.10 in some embodiments. The viscosity ratio of the polyolefin to the ethylene/(meth)acrylic acid copolymer is greater than 1 and less than 10 in some embodiments, greater than 1.5 and less than 10 in some embodiments, and greater than 1.5 and less than 5 in some embodiments. In some embodiments, the melt index ($I_2$) of the polyolefin is less than 10 g/10 minutes.

In some embodiments, the polymer blend further comprises an inorganic filler. The inorganic filler, in some embodiments, comprises calcium carbonate, magnesium carbonate, or a combination thereof. In some embodiments wherein the polymer blend comprises an inorganic filler, the inorganic filler comprises up to 50 weight percent of the blend based on the total weight of the blend.

In some embodiments, the polymer blend further comprises at least one of an oxidant, a colorant, a slip agent, an antiblock, a processing aid, or a combination thereof.

The polymer blend can comprise a combination of two or more embodiments as described herein.

Embodiments of the present invention also relate to multilayer structures that include a layer formed from a polymer blend of the present invention. In one aspect, a multilayer structure comprises at least two layers, each layer having opposing facial surfaces, wherein Layer A comprises a polymer blend according to any of the embodiments disclosed herein, wherein Layer B comprises a substrate, and wherein a top facial surface of Layer B is in adhering contact with a bottom facial surface of Layer A. In some embodiments, the substrate comprises aluminum foil or metallized film. The adhesion of Layer A to Layer B is at least 3 N/inch when measured using a 180 degree peel test based on ASTM F904 with a crosshead speed of 3 inches/minute, in some embodiments. The adhesion of Layer A to Layer B, in some embodiments, is at least 5 N/inch when measured using a 180 degree peel test based on ASTM F904 with a crosshead speed of 3 inches/minute. In some embodiments, Layer A is extrusion coated on Layer B at a melt temperature of 300° C.

In some embodiments, the multilayer structure further comprises Layer C, wherein a top facial surface of Layer A is in adhering contact with a bottom facial surface of Layer C. In some such embodiments, Layer C comprises a polyolefin.

Multilayer structures of the present invention comprise a combination of two or more embodiments as described herein.

Embodiments of the present invention also relate to articles comprising any of the multilayer structures (e.g., multilayer films) disclosed herein.

Polymer Blends

Polymer blends according to embodiments of the present invention comprise a copolymer comprising ethylene and at least one of acrylic acid and methacrylic acid having certain features specified herein and a polyolefin having certain features as specified herein. For ease of reference, the copolymer comprising ethylene and at least one of acrylic acid and methacrylic acid will also be referred to herein as "ethylene/(meth)acrylic acid copolymer" with the understanding that some such copolymers can comprise both acrylic acid monomer and methacrylic acid monomer.

The ethylene/(meth)acrylic acid copolymer used in embodiments of the present invention is characterized as a random copolymer. Such ethylene/(meth)acrylic acid copolymers can be prepared at high pressure by the action of a free-radical polymerization initiator, acting on a mixture of ethylene and acrylic acid and/or methacrylic acid monomers using techniques known to those of skill in the art. The ethylene/(meth)acrylic acid copolymers used in polymer blends of the present invention are more precisely referred to as interpolymers because they are formed by the polymerization of a mixture of the comonomers, in contradistinction to copolymers made by "grafting" or "block-polymerization" methods.

The ethylene/(meth)acrylic acid copolymer used in some embodiments of the present invention can be characterized as having an acid content greater than 4 and up to 25 weight percent based on the weight of the copolymer. The ethylene/(meth)acrylic acid copolymer has an acid content greater than 5 weight percent and up to 15 weight percent based on the weight of the copolymer in some preferred embodiments. The ethylene/(meth)acrylic acid copolymer has an acid content greater than 6 weight percent and up to 12 weight percent based on the weight of the copolymer in some preferred embodiments. The ethylene/(meth)acrylic acid copolymer has an acid content greater than 7 weight percent and up to 12 weight percent based on the weight of the copolymer in some preferred embodiments.

The ethylene/(meth)acrylic acid copolymer may further be characterized as having a melt index ($I_2$) of 1 to 60 g/10 minutes in some embodiments. All individual values and subranges between 1 and 60 g/10 minutes are included herein and disclosed herein. For example, the ethylene/(meth)acrylic acid copolymer can have a melt index from a lower limit of 1, 5, 10, 15, or 20 g/10 minutes to an upper limit of 10, 15, 20, 25, 30, 35, 40, 45, 50, or 55 g/10 minutes. In some embodiments, the ethylene/(meth)acrylic acid copolymer has a melt index ($I_2$) of 1 to 40 g/10 minutes, and 1 to 30 g/10 minutes in some embodiments.

The polymer blend comprises 45 to 99 weight percent ethylene/(meth)acrylic acid copolymer based on the weight of the blend in some embodiments. In some embodiments, the polymer blend comprises greater than 50 weight percent ethylene/(meth)acrylic acid copolymer based on the weight of the blend in some embodiments. In some embodiments, the polymer blend comprises at least 55 weight percent of the ethylene/(meth)acrylic acid copolymer based on the weight of the blend. In some embodiments, the polymer blend can comprise greater than 50 to 95 wt % ethylene/(meth)acrylic acid copolymer based on the weight of the blend. All individual values and subranges from 50 to 99 wt % are included and disclosed herein; for example, the amount of the ethylene/(meth)acrylic acid copolymer in the polymer blend can be from a lower limit of 50, 55, 60, 65, 70, 75, or 80 wt % to an upper limit of 75, 80, 85, 90, 95, or 99 wt %. For example, the amount of ethylene/(meth)acrylic acid copolymer in the polymer blend can be from 50 to 99 wt %, or in the alternative, from 55 to 95 wt %, or in the alternative, from 55 to 85 wt %, or in the alternative, from 57 to 75 wt %.

Examples of commercially available ethylene/(meth)acrylic acid copolymers that can be used in embodiments of the present invention include PRIMACOR™ ethylene/acrylic acid copolymers, which are commercially available from The Dow Chemical Company, Escor ethylene/acrylic acid copolymers commercially available from Exxon Mobil Corp., Nucrel ethylene/methacrylic acid copolymers commercially available from DuPont, and ethylene/methacrylic acid copolymers commercially available from INEOS.

In addition to an ethylene/(meth)acrylic acid copolymer, polymer blends of the present invention further comprise a polyolefin having a density of 0.870 g/cm$^3$ or more and a melt index ($I_2$) of 20 g/10 minutes or less. Such polyolefins can include polymers that comprises, in polymerized form, a majority amount of ethylene or propylene monomer (based on the weight of the polymer), and optionally may comprise one or more comonomers.

In some embodiments, the polyolefin comprises a polyethylene having a density of 0.870 g/cm$^3$ or more and a melt index ($I_2$) of 20 g/10 minutes or less. All individual values and subranges from equal to or greater than 0.870 g/cm$^3$ are included and disclosed herein; for example the density of the polyethylene can be equal to or greater than 0.870 g/cm$^3$, or in the alternative, equal to or greater than 0.900 g/cm$^3$, or in the alternative, equal to or greater than 0.910 g/cm$^3$, or in the alternative, equal to or greater than 0.925 g/cm$^3$, or in the alternative, equal to or greater than 0.935 g/cm$^3$. In a particular embodiment, the polyethylene has a density equal or less than 0.970 g/cm$^3$. All individual values and subranges from equal to or less than 0.970 g/cm$^3$ are included and disclosed herein. For example, the density of the polyethylene can be equal to or less than 0.970 g/cm$^3$, or in the alternative, equal to or less than 0.960 g/cm$^3$, or in the alternative, equal to or less than 0.955 g/cm$^3$, or in the alternative, equal to or less than 0.950 g/cm$^3$, or in the alternative, equal to or less than 0.940 g/cm$^3$. When the polyolefin comprises polypropylene, persons of skill in the art can identify an appropriate density for the polypropylene based on the teachings herein.

In some embodiments, the polyolefin has a melt index ($I_2$) of 20 g/10 minutes or less. All individual values and subranges up to 20 g/10 minutes are included herein and disclosed herein. For example, the polyolefin can have a melt index from a lower limit of 0.2, 0.25, 0.5, 0.75, 1, 2, 4, 5, 10 or 15 g/10 minutes to an upper limit of 1, 2, 4, 5, 10, or 15 g/10 minutes. The polyolefin has a melt index ($I_2$) of up to 15 g/10 minutes in some embodiments. The polyolefin has a melt index ($I_2$) of up to 10 g/10 minutes in some embodiments. In some embodiments, the polyolefin has a melt index ($I_2$) less than 5 g/10 minutes.

Polyethylenes that are particularly well-suited for use in some embodiments of the present invention include linear low density polyethylene (LLDPE), low density polyethylene (LDPE), high density polyethylene (HDPE), medium density polyethylene (MDPE), polyolefin elastomers, polyolefin plastomers, cyclic olefin copolymers, olefin block copolymers, and combinations thereof. In some embodiments, the polyolefin comprises low density polyethylene (LDPE) and/or linear low density polyethylene (LLDPE).

When the polyolefin comprises LDPE and/or LLDPE, the density of the LDPE or LLDPE will typically be in the range of 0.916 to 0.935 g/cm$^3$. When the polyolefin comprises HDPE, the density of the HDPE will typically be in the range of greater than 0.935 g/cm$^3$ up to 0.970 g/cm$^3$.

Examples of commercially available LDPE that can be used in embodiments of the present invention include DOW™ LDPE 132i, DOW™ LDPE 4012, and AGILITY™ 1001, as well as other low density polyethylenes, which are commercially available from The Dow Chemical Company. Examples of commercially available LLDPE that can be used in embodiments of the present invention include DOWLEX™ linear low density polyethylene, such as DOWLEX™ 2045 and DOWLEX™ 2740G as well as others, which are commercially available from The Dow Chemical Company. Examples of commercially available HDPE that can be used in embodiments of the present invention include DOW™ HDPE resins and DOWLEX™ 2050B, as well as other as other high density polyethylenes, which are commercially available from The Dow Chemical Company. In addition to HDPE resins, the polyolefin used in the polymer blend can also include enhanced polyethylenes having densities greater than 0.935 g/cm$^3$. Examples of commercially available enhanced polyethylene resins having high densities that can be used in embodiments of the present invention include ELITE™, and other enhanced polyethylene resins which are commercially available from The Dow Chemical Company. Further, in some embodiments, the polyolefin used in the polymer blend can also include enhanced polyethylenes having densities of 0.935 g/cm$^3$ or less such as, for example, ELITE™ enhanced polyethylenes commercially available from The Dow Chemical Company. Examples of commercially available polyolefin plastomers that can be used in embodiments of the present invention include AFFINITY™ polyolefin plastomers, such as AFFINITY™ PL 1880G as well as others, which are commercially available from The Dow Chemical Company. Examples of commercially available olefin block copolymers that can be used in embodiments of the present invention include INFUSE™ olefin block copolymers, such as INFUSE™ 9107 as well as others, which are commercially available from The Dow Chemical Company.

Persons of skill in the art can select suitable commercially available polypropylenes for use in polymer blends based on the teachings herein.

The polymer blend comprises 1 to 55 weight percent polyolefin based on the weight of the blend in some embodiments. In some embodiments, the polymer blend comprises 50 weight percent or less polyolefin based on the weight of the blend in some embodiments. In some embodiments, the polymer blend comprises less than 45 weight percent of the polyolefin based on the weight of the blend. In some embodiments, the polymer blend can comprise 5 to 50 wt % polyolefin based on the weight of the blend. All individual values and subranges from 1 to 55 wt % are included and disclosed herein; for example, the amount of polyolefin in the polymer blend can be from a lower limit of 1, 5, 10, 15, 20, 25, 30, 35, or 40 wt % to an upper limit of 25, 30, 35, 40, 45, 50, or 55 wt %. For example, the amount of polyolefin in the polymer blend can be from 1 to 50 wt %, or in the alternative, from 5 to 45 wt %, or in the alternative, from 15 to 45 wt %, or in the alternative, from 25 to 43 wt %.

The relative viscosity ratio of the polyolefin to the ethylene/(meth)acrylic acid copolymer can be important in some embodiments. As used herein, "relative viscosity ratio" or "RVR" refers to the melt index ($I_2$) of a first component divided by the melt index ($I_2$) of a second component. Thus, the RVR of the polyolefin to the ethylene/(meth)acrylic acid copolymer is determined by dividing the melt index ($I_2$) of the polyolefin by the melt index ($I_2$) of the ethylene/(meth)acrylic acid copolymer. In some embodiments, the RVR of the polyolefin to the ethylene/(meth)acrylic acid copolymer is less than 0.15, preferably less than 0.10. While not wishing to be bound by any particular theory, it is believed that such RVR values for polyolefin to ethylene/(meth)acrylic acid copolymer contribute to desirable adhesion when used as a tie layer in a multilayer structure and particularly when one of the layers is a metal foil or metallized film. Further, in some embodiments, the adhesion strength to a layer of aluminum foil can be adjusted by changing the RVR of the polyolefin to the ethylene/(meth)acrylic acid copolymer.

The viscosity ratio of the polyolefin to the ethylene/(meth)acrylic acid copolymer can be important in some embodiments. As used herein, "viscosity ratio" refers to the viscosity of a first component divided by the viscosity of a second component when the viscosity is determined at a temperature of 190° C. at an applied shear rate of 1000 $s^{-1}$. Thus, the viscosity ratio of the polyolefin to the ethylene/(meth)acrylic acid copolymer is determined by dividing the determined viscosity of the polyolefin by the determined viscosity of the ethylene/(meth)acrylic acid copolymer. To calculate the "viscosity ratio" between two components as used herein, the viscosity at 190° C. and 1000 $s^{-1}$ of each component is measured as described above.

In some embodiments, the viscosity ratio of the polyolefin to the ethylene/(meth)acrylic acid copolymer, when viscosities are measured as described above at 190° C. under an applied shear rate of 1,000 $s^{-1}$, is greater than 1 and less than 10, preferably greater than 1.5 and less than 10, and more preferably greater than 1.5 and less than 5. While not wishing to be bound by any particular theory, it is believed that such viscosity ratio values for polyolefin to ethylene/(meth)acrylic acid copolymer contribute to desirable adhesion when used as a tie layer in multilayer structure and particularly when one of the layers is a metal foil or a metallized film. Persons skilled in the art should recognize that the determined viscosity of each component in a polymer blend used to calculate the viscosity ratio between the components is bound to change based on processing conditions. Experimentally accessible conditions are used as a reference to measure the viscosities of the components, and are not intended to serve as limits for any of the embodiments disclosed herein.

In some embodiments, the polymer blend further comprises one or more inorganic fillers. Examples of inorganic fillers that can be incorporated in polymer blends according to some embodiments include calcium carbonate, magnesium carbonate, or a combination thereof. Inorganic fillers can be included in some embodiments to reduce costs, improve sealing properties, improve prints, or other reasons. The polymer blend comprises up to 50 weight percent inorganic filler based on the weight of the blend in some embodiments. All individual values and subranges from 0 to 50 wt % are included and disclosed herein; for example, the amount of inorganic filler in the polymer blend can be from a lower limit of 1, 5, 10, 15, 20, 25, 30, 35, or 40 wt % to an upper limit of 25, 30, 35, 40, 45, or 50 wt %.

In some embodiments, the polymer blend can further comprise one or more additives known to those of skill in the art including, for example, antioxidants, colorants, slip agents, antiblocks, processing aids, and combinations thereof. In some embodiments, the polymer blend comprises up to 5 weight percent of such additives. All individual values and subranges from 0 to 5 wt % are included and disclosed herein; for example, the total amount of additives in the polymer blend can be from a lower limit of 0.5, 1, 1.5, 2, 2.5, 3, 3.5, 4, or 4.5 wt % to an upper limit of 1, 2, 3, 4, or 5 wt %.

When electron micrographs of some embodiments of the polymer blend are prepared using the technique described in Example 1 below, a two-phase morphology resembling "islands in an ocean" is observed, where discrete polyethylene domains (islands) are dispersed in a continuous phase of ethylene/(meth)acrylic acid copolymer (ocean). In some such embodiments, a significant number of the polyethylene domains have an elongated shape (they have a length that is at least twice as long their width). In some such embodiments, at least a majority of the polyethylene domains having an elongated shape have a width that is 0.2 microns or greater. In some embodiments, at least a majority of the polyethylene domains having an elongated shape have a width that is between 0.2 microns and 0.5 microns.

As will be discussed below, a polymer blend of the present invention can be incorporated/converted into a final fabricated product (e.g., a multilayer structure) via extrusion coating (or other equipment) using techniques known to those of skill in the art based on the teachings herein.

Polymer blends of the present invention can be prepared by melt blending the prescribed amounts of the components with a twin screw extruder before feeding into an extrusion coater (or other equipment) for film fabrication. Such polymer blends can also be prepared by tumble blending the prescribed amounts of the components before feeding into the extrusion coater (or other equipment) for film fabrication. In some embodiments, polymer blends of the present invention can be in the form of pellets. For example, the individual components can be melt blended and then formed into pellets using a twin screw extruder or other techniques known to those of skill in the art based on the teachings herein. In some embodiments, a polymer blend can include the combination of a compounded pellet and additional polymer that is tumble blended before feeding into the extrusion coater. For example, a pellet comprising a blend of ethylene/(meth)acrylic acid copolymer and polyolefin (e.g., LDPE) can be tumble blended with additional polyolefin (e.g., additional LDPE) to provide a polymer blend having the desired weight percentages of ethylene/(meth)acrylic acid copolymer and polyolefin.

Multilayer Structures

In some embodiments, the present invention relates to multilayer structures in which at least one layer is formed from a polymer blend according to any embodiment disclosed herein. The multilayer structure, in some embodiments, comprises at least two layers, with each having opposing facial surfaces. In such embodiments, a first layer (Layer A) (e.g., a layer comprising a polymer blend of the present invention) is in adhering contact with a second layer (Layer B), with a top facial surface of the second layer (Layer B) being in adhering contact with a bottom facial surface of the first layer (Layer A).

In embodiments wherein a first layer (Layer A) is formed from a polymer blend of the present invention, a second layer (Layer B) can comprise a substrate. Examples of substrates that can be used as the second layer (Layer B) in embodiments of the present invention include metal foils, woven mats (e.g., woven fiber glass mats), nonwoven mats (e.g., nonwoven fiber glass mats), scrims, metallized films (e.g., metallized PET), and polymeric films (e.g., oriented polypropylene, oriented PET, etc.). Polymer blends of the present invention are particularly useful in adhering to metal foils or metallized films. Any metal foil or metallized film may form the substrate onto which the polymer blend layer is applied. Exemplary metal foils include aluminum foil and copper foil. The foil, when present, may, but need not, be flame or corona treated or subjected to other treatment so as to improve wettability and/or adhesion. Exemplary metallized films include metallized PET films, metallized oriented polypropylene films, metallized polyamide films, and metallized polyethylene films. In some embodiments, substrates other than metal foils can also be flame or corona treated or subjected to other treatment so as to improve wettability and/or adhesions. In some such embodiments, the substrates comprise oriented polypropylene or oriented polyamide films. Persons of skill in the art can identify such substrates based on the teachings herein.

In some embodiments, a multilayer structure of the present invention comprises a first layer (Layer A) formed from a polymer blend according to any of the embodiments disclosed herein and a second layer (Layer B) comprising a metal substrate (e.g., a metal foil or a metallized film) in adhering contact with the first layer, wherein the adhesion of the first layer to metal substrate (e.g., metal foil) is at least 3 N/inch when measured using a 180 degree peel test based on ASTM F904 with a crosshead speed of 3 inches/minute, at least 5 N/inch in some embodiments, and at least 6 N/inch in other embodiments. In some embodiments, the metal substrate is aluminum foil.

In embodiments wherein the multilayer structure includes a metal foil layer (e.g., an aluminum foil layer), the metal foil has a thickness from 0.20 to 2.0 mil, more preferably from 0.20 to 0.50 mil. All individual values and subranges from 0.20 to 0.50 mil are included and disclosed herein; for example, the metal foil layer thickness can range from a lower limit of 0.20, 0.25, 0.30, 0.35, 0.40 or 0.45 mil to an upper limit of 0.30, 0.35, 0.40, 0.45, or 0.50 mil. For example, the metal foil layer thickness can range from 0.20 to 0.50 mil, or in the alternative, from 0.20 to 0.60 mil, or in the alternative, from 0.60 to 1.0 mil, or in the alternative, from 0.25 to 0.50 mil. To one skilled in the art the thickness of the metal foil layer is defined as sufficient for the application.

In embodiments wherein the multilayer structure includes a metallized film layer (e.g., a metallized PET film, a metallized oriented polypropylene film, a metallized polyamide film, or a metallized polyethylene film), the metallized layer on the film can have a variety of thicknesses depending on factors such as performance (e.g., barrier properties, opacity, etc.) and cost. In some embodiments, the metallized layer on the metallized film layer has a thickness from 3 to 40 nm. All individual values and subranges from 3 to 40 nm are included and disclosed herein; for example, the metallized layer thickness can range from a lower limit of 3, 5, 10, 17, 20, 22, 25, 30, or 35 nm to an upper limit of 10, 12, 15, 20, 23, 25, 32, 35, 37, or 40 nm. To one skilled in the art the thickness of the metallized layer of the metallized film is defined as sufficient for the application.

The layer formed from the polymer blend can be applied to a metal substrate layer (e.g., metal foil) by any acceptable manner, such as extrusion lamination and/or extrusion coating. In extrusion coating the polymer blend layer on the metal substrate layer (e.g., metal foil), in some embodiments, the polymer blends can maintain acceptable levels of neck-in and draw down speed while providing acceptable adhesion to the metal foil layer. Polymer blends of the present invention, in some embodiments, can be extrusion coated on a metal substrate layer at temperatures (e.g., ~300° C. or less) lower than temperatures (e.g., ~320° C.) used when a polymer layer comprising only low density polyethylene is extrusion coated, while still providing acceptable adhesion to the metal substrate. Thus, the ability to extrusion coat at a relatively lower temperature while achieving acceptable adhesion is one advantage of some embodiments of the present invention.

In some embodiments, a layer formed from a polymer blend of the present invention can be in adhering contact with another layer, in addition to a substrate (e.g., in addition to a metal foil layer). For example, in some embodiments, the layer formed from the polymer blend can additionally be in adhering contact with a layer comprising a polyolefin. That is, in such embodiments, the layer formed from a polymer blend of the present invention can be between the polyolefin layer and the substrate (e.g., the metal foil), with a top facial surface of the substrate being in adhering contact with a bottom facial surface of the polymer blend layer, and with a top facial surface of the polymer blend layer being in adhering contact with a bottom facial surface of the polyolefin layer.

In embodiments comprising a polyolefin layer, the polyolefin can be any polyethylene, polypropylene, and their derivatives (e.g., ethylene-propylene copolymer) known to those of skill in the art to be suitable for use as a layer in a multilayer structure based on the teachings herein. For example, the polyethylene that can be used in such a layer, as well as other layers in the multilayer structure, in some embodiments, can be ultralow density polyethylene (ULDPE), low density polyethylene (LDPE), linear low density polyethylene (LLDPE), medium density polyethylene (MDPE), high density polyethylene (HDPE), high melt strength high density polyethylene (HMS-HDPE), ultrahigh density polyethylene (UHDPE), homogeneously branched ethylene/α-olefin copolymers made with a single site catalyst such as a metallocene catalyst or a constrained geometry catalyst, and combinations thereof. In some embodiments, polyethylenes used in the polyolefin layer can be made via gas-phase polymerization. In some embodiments, polyethylenes used in the polyolefin layer can be made by gas-phase, solution-phase or slurry polymerization or any combination thereof, using any type of reactor or reactor configuration known in the art.

Some embodiments of multilayer structures can include layers beyond those described above. For example, while not necessarily in adhering contact with a layer formed from a polymer blend according to the present invention (though, in some embodiments, such layers can be in contact with the layer formed from such a polymer blend), a multilayer structure can further comprise other layers typically included in multilayer structures depending on the application including, for example, barrier layers, sealant layers, tie layers, other polyethylene layers, polypropylene layers, etc. Additionally, other layers such as printed, high modulus, high gloss layers may be laminated to multilayer structures (e.g., films) of the present invention. Further, in some embodiments, the multilayer structure can be extrusion coated to a fiber containing substrate such as paper or fiber glass (e.g., nonwoven mats, woven mats, scrims, and the like).

In addition to extrusion coating, multilayer structures of the present invention can be coextruded as blown films or cast films using techniques known to those of skill in the art based on the teachings herein. In some embodiments, multilayer structures of the present invention can also be formed by lamination or by a combination of blown/cast film followed by thermal lamination.

Packaging

In some embodiments, the present invention relates to packaging comprising the multilayer structure of any embodiment disclosed herein. In a particular embodiment, the packaging is a retort and/or sterilization packaging. The packaging may be used to contain, in various embodiments, solids, slurries, liquids, or gasses. By way of example and not limitation, the packaging may be used to contain acidic solutions, corn oil, alcohols, meats, cheeses, sun screen, shampoo, spice, soy sauce, creamer, flavored coffee, milk, juice, detergent, aseptic food, hot fill juice, fatty food, baby wipe, iodine solution, salad dressing, ketchup, sauces, and other items.

Some embodiments of the invention will now be described in detail in the following Examples.

EXAMPLES

The following raw materials are used in the examples discussed below:

| Product | Melt Index (I$_2$) (dg/min) | Density (g/cc) | Acid Comonomer Content (wt %) |
|---|---|---|---|
| DOW ™ LDPE 722 | 8.0 | 0.918 | — |
| DOW ™ LDPE 4012 | 12.0 | 0.918 | — |
| DOW ™ LDPE 132i | 0.25 | 0.921 | — |
| AGILITY ™ 1001 | 0.65 | 0.920 | — |
| DOW ™ DFDA-7047 NT 7 | 1.0 | 0.918 | — |
| DOWLEX ™ 2045 | 1.0 | 0.920 | — |
| DOWLEX ™ 2050B | 0.95 | 0.950 | — |
| DOWLEX ™ 2740G | 1.0 | 0.940 | — |
| ELITE ™ 5400G | 1.0 | 0.916 | — |
| AFFINITY ™ PL 1880G | 1.0 | 0.902 | — |
| INFUSE ™ 9107 | 1.0 | 0.866 | — |
| PRIMACOR ™ 3150 | 11 | 0.924 | 3.0 |
| PRIMACOR ™ 3340 | 8.6 | 0.932 | 6.5 |
| PRIMACOR ™ 3440 | 10.0 | 0.940 | 9.7 |
| PRIMACOR ™ 3460 | 19.5 | 0.940 | 9.7 |

DOW™ LDPE 722, DOW™ LDPE 4012, DOW™ LDPE 132i, and AGILITY™ 1001 are each low density polyethylene resins commercially available from The Dow Chemical Company. DOWLEX™ 2045, and DOW™ DFDA-7047 NT 7 are each linear low density polyethylenes commercially available from The Dow Chemical Company. DOWLEX™ 2050B and DOWLEX™ 2740G are high density polyethylenes commercially available from The Dow Chemical Company. ELITE™ 5400G is an enhanced polyethylene commercially available from The Dow Chemical Company. AFFINITY™ PL 1880G is a polyolefin plastomer commercially available from The Dow Chemical Company. INFUSE™ 9107 is an olefin block copolymer commercially available from The Dow Chemical Company. PRIMACOR™ 3150, PRIMACOR™ 3340, PRIMACOR™ 3440, and PRIMACOR™ 3460 are each ethylene/acrylic acid copolymers commercially available from The Dow Chemical Company.

The viscosity at 190° C. and 1000 s$^{-1}$ for each of the raw materials is determined using the procedure described above. The relevant data and viscosities are as follows:

| Product | 1st Viscosity Measurement [Shear rate] | 2nd Viscosity Measurement [Shear rate] | Viscosity at 190° C. and 1000 s$^{-1}$ |
|---|---|---|---|
| DOW ™ LDPE 722 | — | — | — |
| DOW ™ LDPE 4012 | 118.28 Pa-s [767.80 s$^{-1}$] | 91.95 Pa-s [1264.80 s$^{-1}$] | 103.52 Pa-s |
| DOW ™ LDPE 132i | 254.34 Pa-s [950.89 s$^{-1}$] | 179.85 Pa-s [1551.73 s$^{-1}$] | 245.44 Pa-s |
| AGILITY ™ 1001 | 196.31 Pa-s [919.54 s$^{-1}$] | 142.91 Pa-s [1492.98 s$^{-1}$] | 185.81 Pa-s |
| DOW ™ DFDA-7047 NT 7 | 575.36 Pa-s [617.92 s$^{-1}$] | 350.25 Pa-s [1151.31 s$^{-1}$] | 391.91 Pa-s |
| DOWLEX ™ 2045 | 560.79 Pa-s [578.29 s$^{-1}$] | 354.99 Pa-s [1047.62 s$^{-1}$] | 367.93 Pa-s |
| DOWLEX ™ 2050B | 480.41 Pa-s [783.22 s$^{-1}$] | 276.91 Pa-s [1303.74 s$^{-1}$] | 368.88 Pa-s |
| DOWLEX ™ 2740G | 530.94 Pa-s [657.85 s$^{-1}$] | 318.72 Pa-s [1173.88 s$^{-1}$] | 367.09 Pa-s |
| ELITE ™ 5400G | 367.35 Pa-s [972.57 s$^{-1}$] | 232.77 Pa-s [1747.41 s$^{-1}$] | 359.48 Pa-s |
| AFFINITY ™ PL 1880G | 431.62 Pa-s [933.12 s$^{-1}$] | 273.65 Pa-s [1748.40 s$^{-1}$] | 410.47 Pa-s |
| INFUSE ™ 9107 | 359.72 Pa-s [956.75 s$^{-1}$] | 228.38 Pa-s [1756.36 s$^{-1}$] | 348.02 Pa-s |
| PRIMACOR ™ 3150 | 119.64 Pa-s [786.22 s$^{-1}$] | 93.25 Pa-s [1277.99 s$^{-1}$] | 105.76 Pa-s |
| PRIMACOR ™ 3340 | 133.11 Pa-s [779.87 s$^{-1}$] | 103.23 Pa-s [1274.29 s$^{-1}$] | 117.03 Pa-s |
| PRIMACOR ™ 3440 | 143.67 Pa-s [730.37 s$^{-1}$] | 111.80 Pa-s [1196.73 s$^{-1}$] | 122.48 Pa-s |
| PRIMACOR ™ 3460 | 104.73 Pa-s [726.44 s$^{-1}$] | 83.65 Pa-s [1178.31 s$^{-1}$] | 90.27 Pa-s |

Examples 1-7 set forth below are used to illustrate the adhesion of the inventive polymer blend to an aluminum substrate. The aluminum substrate used in each of the examples is prepared as follows. A bleached, 30 pounds per ream paper is extrusion laminated to 0.00035 inch (0.35 mil) Grade A wettable aluminum foil using DOW™ LDPE 722 (The Dow Chemical Company). The laminated sheet is then cut into 3-4 foot lengths to provide the aluminum substrate. Masking tape is applied to the lead edge of the aluminum substrate. The aluminum substrate is not corona treated in any of Examples 1-7.

Example 1

A variety of multilayer structures are prepared as shown in Table 1:

TABLE 1

| | Layer A (percentages are weight %) | Layer B (Substrate) |
|---|---|---|
| Comparative Example A | 100% LDPE 722 | Aluminum substrate |
| Comparative Example B | 100% PRIMACOR ™ 3440 | Aluminum substrate |
| Comparative Example C | 60% PRIMACOR ™ 3440 40% LDPE 4012 | Aluminum substrate |
| Inventive Example 1 | 60% PRIMACOR ™ 3440 40% LDPE 132i | Aluminum substrate |
| Inventive Example 2 | 60% PRIMACOR ™ 3440 40% DOWLEX ™ 2045 | Aluminum substrate |

Layer A is coated as a monolayer onto the aluminum substrate as described below.

All of the examples herein are prepared by extrusion coating the polymer layer (Layer A) onto the aluminum substrate (Layer B) utilizing a Black Clawson extrusion coater. Pellets of the polymer used for Layer A in Comparative Examples A and B are fed directly from a box of commercial material. Layer A in Comparative Example C and Inventive Examples 1 and 2 are prepared by melt blending the prescribed amounts of the two components via a twin screw extruder fitted with a general purpose screw prior to feeding the blend to the extrusion coater. The aluminum substrate is dropped down onto the moving 50 pounds/ream Kraft paper just prior to the chill roll/rubber roll nip where the aluminum substrate is pulled into the nip thus applying Layer A onto the foil side of the aluminum substrate. The resulting flow rate from the die is ~10 pounds/hour of polymer per inch of die opening. A constant air gap of 6 inches is used in fabricating the sample. Each sample consists of a 1 mil thick monolayer of Layer A coated onto the aluminum substrate. The samples are made at a melt temperature of 300° C. and a line speed of 440 feet per minute.

The adhesion of Layer A to the aluminum substrate for each of the samples is determined using a 180 degree peel test based on ASTM standard F904 with a crosshead speed of 3 inches/minute. At least five samples of each Comparative/Inventive Example are measured, and the average values and standard deviations are calculated. The results are shown in Table 2:

TABLE 2

| Property | Compar. Ex. A | Compar. Ex. B | Compar. Ex. C | Inventive Ex. 1 | Inventive Ex. 2 |
|---|---|---|---|---|---|
| Foil adhesion (N/in.) | — | 5.87 ± 0.90 | 0.37 ± 0.07 | 5.10 ± 0.63 | 6.14 ± 0.72 |
| RVR | N/A | N/A | 1.2 | 0.025 | 0.1 |
| Viscosity ratio | N/A | N/A | 0.85 | 2.00 | 3.00 |

The RVR is determined from the melt indices ($I_2$) of the components of Layer A as described above. The viscosity ratio is the ratio of the viscosity at 190° C. and 1000 $s^{-1}$ of the polyethylene component to the viscosity at 190° C. and 1000 $s^{-1}$ of the ethylene/acrylic acid copolymer when measured as described above. For Comparative Example A, there is no measurable adhesion of Layer A to the aluminum substrate at processing conditions. Inventive Examples 1 and 2 illustrate one advantage of some embodiments of the present invention, the ability to extrusion coat a metal substrate at temperatures lower than typically used for extrusion coating of LDPE only onto a metal substrate. Comparative Example A utilized LDPE only but did not have any measurable adhesion when extrusion coated at 300° C., whereas Inventive Examples 1 and 2 each exhibited desirable adhesion values when extrusion coated at that temperature.

The neck-in and draw down speeds for these samples are also measured and the results are shown in Table 3 (in addition to the RVR):

TABLE 3

| Property | Compar. Ex. A | Compar. Ex. B | Compar. Ex. C | Inventive Ex. 1 | Inventive Ex. 2 |
|---|---|---|---|---|---|
| RVR | N/A | N/A | 1.2 | 0.025 | 0.1 |
| Viscosity ratio | N/A | N/A | 0.85 | 2.00 | 3.00 |
| Neck-in (in.) | 1.6 | 3.2 | not measured | 2.2 | 4.8 |
| Draw down speed (fpm) | 1250 | 1500+ (no web tear) | not measured | 600 | 1500+ (no web tear) |
| Reduced draw down speed (fpm) | N/A | 1200 | not measured | N/A | 1350 |

The neck-in (inches) is measured at a line speed of 440 feet per minute. The draw down speed (feet per minute) is the line speed when a web tear is observed while the screw within the extrusion coater is running at 90 rpm, which results in a flow rate of approximately 250 pounds/hour. The reduced draw down speed (feet per minute) is the line speed when a web tear is observed while the screw within the extrusion coater is running at 45 rpm. The maximum value for draw down speed and reduced draw down speed is 1500 feet per minute, and the reduced draw down speed is only determined if the line speed reaches 1500 feet per minute when the extruder runs at 90 rpm. Table 3 illustrates that Inventive Examples 1 and 2 exhibit performance properties that would be acceptable for extrusion coating applications.

The morphology of Inventive Examples 1 and 2 and Comparative Example C are then examined as follows. Portions of the coated aluminum substrate (Layer A+Layer B) for each of the two Inventive Examples and the Comparative Example are embedded in EpoFix™ low viscosity epoxy, then polished and trimmed. The trimmed samples are placed on a glass slide using double sided tape and exposed to the vapor of a 2% aqueous solution of ruthenium tetraoxide ($RuO_4$) for 3 hours at ambient temperature to enhance contrast. The staining solution was prepared by mixing 0.2 g of ruthenium (III) chloride hydrate ($RuCl_3.H_2O$) with 10 mL of a 5.25% aqueous sodium hypochlorite solution in a glass bottle with a screw top cap. The $RuO_4$ vapors preferentially stain the ethylene/acrylic acid copolymer phase providing contrast for electron microscopy. The stained block faces are cryogenically polished and placed on aluminum sample stubs. The samples are sputtered with Iridium plasma using an Emitech K575X turbo sputter coater for 25 seconds to render them conductive for scanning electron microscopy. A FEI Nano-600 scanning electron microscope was used at a 5 kV accelerating voltage under backscatter electron imaging mode to collect digital images from the cryopolished block face samples. Under the setup described above, the stained phase (i.e., ethylene/acrylic acid copolymer) appears lighter, whereas the unstained phase (i.e., polyethylene) appears darker.

Electron micrographs of Comparative Example C and Inventive Examples 1 and 2 are taken perpendicular to the machine direction. A two-phase morphology resembling "islands in an ocean" is evident for each of the samples, where discrete polyethylene domains (islands) are dispersed in a continuous phase of ethylene/acrylic acid copolymer (ocean). When the images are compared under the same magnification (e.g., 5×), the average size of the polyethylene domains (islands) in the images for Inventive Examples 1 and 2 are similar to each other. However, when an image of either Inventive Example 1 or 2 is compared to an image of Comparative Example C under the same magnification, the average size of the polyethylene domains (islands) in the Inventive Examples is least one order of magnitude larger relative to the average size of the polyethylene domains in Comparative Example C. The average domain size for the dispersed phase is related to the ratio of the viscosities of each component in the polymer blend. In addition to the differences in size, the number of polyethylene domains (islands) in Inventive Examples 1 and 2 is smaller compared to the number of polyethylene domains in Comparative Example C. Although the size and number of polyethylene domains (islands) is different between Inventive Examples 1 and 2 and Comparative Example C, their general shape is similar. In particular, the polyethylene domains (islands) in each of the samples are generally elongated as a consequence of the deformation profiles applied during processing of the molten polymer blend. However, in Inventive Examples 1 and 2, the polyethylene domains having an elongated shape (those domains having a length that is at least twice as long as its width), the width of the polyethylene domains is generally between 0.2 and 0.5 microns whereas the width of polyethylene domains in Comparative Example C is generally less than 0.1 micron. The coarser morphology associated with a large difference in viscosity between the dispersed phase (polyethylene) and the continuous phase (ethylene/acrylic acid copolymer) in Inventive Examples is beneficial as it is believed to contribute to the higher adhesion values observed.

Example 2

Additional multilayer structures are prepared as shown in Table 4:

TABLE 4

| Layer A (percentages are weight %) | Layer B (Substrate) |
| --- | --- |
| Inventive Example 1 60% PRIMACOR ™ 3440 40% LDPE 132i | Aluminum substrate |
| Inventive Example 3 60% PRIMACOR ™ 3440 40% LDPE 132i 200 ppm Antioxidant | Aluminum substrate |
| Inventive Example 2 60% PRIMACOR ™ 3440 40% DOWLEX ™ 2045 | Aluminum substrate |
| Inventive Example 4 60% PRIMACOR ™ 3440 40% DOWLEX ™ 2045 200 ppm Antioxidant | Aluminum substrate |

Inventive Examples 3 and 4 incorporate 200 ppm of an antioxidant (Irganox 1076 commercially available from BASF) for comparison to Inventive Examples 1 and 2, respectively. Layer A is coated as a monolayer onto the aluminum substrate as described below.

Each of the examples are prepared by extrusion coating the polymer layer (Layer A) onto the aluminum substrate (Layer B) utilizing a Black Clawson extrusion coater. Layer A in Inventive Examples 3 and 4 are prepared by melt blending the prescribed amounts of the two components via a twin screw extruder fitted with a lighter design screw (relative to a general purpose screw) prior to feeding the blend to the extrusion coater. The antioxidants in Inventive Examples 3 and 4 are incorporated into the blends via a master batch process prior to melt blending. The aluminum substrate is dropped down onto moving 50 pounds/ream Kraft paper just prior to the chill roll/rubber roll nip where the aluminum substrate is pulled into the nip thus applying Layer A onto the foil side of the aluminum substrate. Each sample consists of a 1 mil thick monolayer of Layer A coated onto the aluminum substrate. The samples are made at a melt temperature of 300° C. and a line speed of 440 feet per minute.

The adhesion of Layer A to the aluminum substrate for each of the samples is measured as described above in Example 1. At least five samples of each Inventive Example are measured, and the average values and standard deviations are calculated. The results are shown in Table 5:

TABLE 5

| Property | Inventive Ex. 1 | Inventive Ex. 3 | Inventive Ex. 2 | Inventive Ex. 4 |
| --- | --- | --- | --- | --- |
| Foil adhesion (N/in.) | 5.10 ± 0.63 | 5.55 ± 0.52 | 6.14 ± 0.72 | 4.91 ± 0.99 |
| RVR | 0.025 | 0.025 | 0.1 | 0.1 |
| Viscosity ratio | 2.00 | 2.00 | 3.00 | 3.00 |

The RVR is determined from the melt indices ($I_2$) of the components of Layer A as described above. The viscosity ratio is the ratio of the viscosity at 190° C. and 1000 $s^{-1}$ of the polyethylene component to the viscosity at 190° C. and 1000 $s^{-1}$ of the ethylene/acrylic acid copolymer when measured as described above. Table 5 illustrates that the inclusion of some amount of antioxidant does not appear to have a detrimental effect on adhesion.

Example 3

Additional multilayer structures are prepared as shown in Table 6:

TABLE 6

| | Layer A (percentages are weight %) | Layer B (Substrate) |
|---|---|---|
| Inventive Example 1 | 60% PRIMACOR ™ 3440 40% LDPE 132i | Aluminum substrate |
| Inventive Example 5 | 60% PRIMACOR ™ 3440 40% LDPE 132i | Aluminum substrate |
| Inventive Example 2 | 60% PRIMACOR ™ 3440 40% DOWLEX ™ 2045 | Aluminum substrate |
| Inventive Example 6 | 60% PRIMACOR ™ 3440 40% DOWLEX ™ 2045 | Aluminum substrate |

Layer A in Inventive Examples 5 and 6 is tumble blended for comparison to Inventive Examples 1 and 2, respectively, in which Layer A is melt blended. Layer A is coated as a monolayer onto the aluminum substrate as described below.

Each of the examples are prepared by extrusion coating the polymer layer (Layer A) onto the aluminum substrate (Layer B) utilizing a Black Clawson extrusion coater. Layer A in Inventive Examples 5 and 6 are prepared by tumble blending the prescribed amounts of the two components for ~30 minutes prior to feeding the extrusion coater. The aluminum substrate is dropped down onto moving 50 pounds/ream Kraft paper just prior to the chill roll/rubber roll nip where the aluminum substrate is pulled into the nip thus applying Layer A onto the foil side of the aluminum substrate. Each sample consists of a 1 mil thick monolayer of Layer A coated onto the aluminum substrate. The samples are made at a melt temperature of 300° C. and a line speed of 440 feet per minute.

The adhesion of Layer A to the aluminum substrate for each of the samples is measured as described above in Example 1. At least five samples of each Inventive Example are measured, and the average values and standard deviations are calculated. The results are shown in Table 7:

TABLE 7

| Property | Inventive Ex. 1 | Inventive Ex. 5 | Inventive Ex. 2 | Inventive Ex. 6 |
|---|---|---|---|---|
| Foil adhesion (N/in.) | 5.10 ± 0.63 | 3.80 ± 0.77 | 6.14 ± 0.72 | 3.11 ± 0.23 |
| RVR | 0.025 | 0.025 | 0.1 | 0.1 |
| Viscosity ratio | 2.00 | 2.00 | 3.00 | 3.00 |

The RVR is determined from the melt indices ($I_2$) of the components of Layer A as described above. The viscosity ratio is the ratio of the viscosity at 190° C. and 1000 $s^{-1}$ of the polyethylene component to the viscosity at 190° C. and 1000 $s^{-1}$ of the ethylene/acrylic acid copolymer when measured as described above. While the tumble blending of the components of Layer A resulted in lower foil adhesion than melt blending of the same components, the foil adhesion values for Inventive Examples 5 and 6 may still be acceptable for some applications.

Example 4

An additional multilayer structure is prepared as shown in Table 8:

TABLE 8

| | Layer A (percentages are weight %) | Layer B (Substrate) |
|---|---|---|
| Inventive Example 7 | 60% PRIMACOR ™ 3460 40% AGILITY ™ 1001 200 ppm Antioxidant | Aluminum substrate |

Inventive Example 7 incorporates 200 ppm of an antioxidant (Irganox 1076 commercially available from BASF). Layer A is coated as a monolayer onto the aluminum substrate as described below.

Inventive Example 7 is prepared by extrusion coating the polymer layer (Layer A) onto the aluminum substrate (Layer B) utilizing a Black Clawson extrusion coater. Layer A is prepared by melt blending the prescribed amounts of the two components via a twin screw extruder fitted with a lighter design screw (relative to a general purpose screw) prior to feeding the blend to the extrusion coater. The antioxidant is incorporated into the blend via a master batch process prior to melt blending. The aluminum substrate is dropped down onto moving 50 pounds/ream kraft paper just prior to the chill roll/rubber roll nip where the aluminum substrate is pulled into the nip thus applying Layer A onto the foil side of the aluminum substrate. Each sample consists of a 1 mil thick monolayer of Layer A coated onto the aluminum substrate. The samples are made at a melt temperature of 300° C. and a line speed of 440 feet per minute.

The adhesion of Layer A to the aluminum substrate for each of the samples is measured as described above in Example 1. Four samples are measured, and the average value and standard deviation is calculated. The results are shown in Table 9:

TABLE 9

| Property | Inventive Ex. 7 |
|---|---|
| Foil adhesion (N/in.) | 6.97 ± 0.61 |
| RVR | 0.033 |
| Viscosity ratio | 2.06 |

The RVR is determined from the melt indices ($I_2$) of the components of Layer A as described above. The viscosity ratio is the ratio of the viscosity at 190° C. and 1000 $s^{-1}$ of the polyethylene component to viscosity at 190° C. and 1000 $s^{-1}$ of the ethylene/acrylic acid copolymer when measured as described above.

Example 5

Additional multilayer structures are prepared as shown in Table 10:

TABLE 10

| | Layer A (percentages are weight %) | Layer B (Substrate) |
|---|---|---|
| Comparative Example D | 100% PRIMACOR ™ 3440 | Aluminum substrate |

TABLE 10-continued

| | Layer A (percentages are weight %) | Layer B (Substrate) |
|---|---|---|
| Inventive Example 8 | 60% PRIMACOR ™ 3440 40% ELITE 5400G | Aluminum substrate |
| Inventive Example 9 | 60% PRIMACOR ™ 3440 40% DOWLEX 2740G | Aluminum substrate |
| Inventive Example 10 | 60% PRIMACOR ™ 3440 40% AFFINITY PL 1880G | Aluminum substrate |
| Inventive Example 11 | 60% PRIMACOR ™ 3440 40% INFUSE 9107 | Aluminum substrate |

Layer A is coated as a monolayer onto the aluminum substrate as described below.

All of the examples herein are prepared by extrusion coating the polymer layer (Layer A) onto the aluminum substrate (Layer B) utilizing a Black Clawson extrusion coater. Pellets of the polymer used for Layer A in Comparative Example D are fed directly from a box of commercial material. Layer A in Inventive Examples 8, 9, and 10 are prepared by melt blending the prescribed amounts of the two components via a twin screw extruder fitted with a general purpose screw prior to feeding the blend to the extrusion coater. Layer A in Inventive Example 11 is prepared by tumble blending the prescribed amounts of the two components for ~30 minutes prior to feeding the extrusion coater. The aluminum substrate is dropped down onto the moving 50 pounds/ream Kraft paper just prior to the chill roll/rubber roll nip where the aluminum substrate is pulled into the nip thus applying Layer A onto the foil side of the aluminum substrate. The resulting flow rate from the die is ~10 pounds/hour of polymer per inch of die opening. A constant air gap of 6 inches is used in fabricating the sample. Each sample consists of a 2 mil thick monolayer of Layer A coated onto the aluminum substrate. The samples are made at a melt temperature of 300° C. and a line speed of 440 feet per minute.

The adhesion of Layer A to the aluminum substrate for each of the samples is determined using a 180 degree peel test based on ASTM standard F904 with a crosshead speed of 10 inches/minute. At least five samples of each Inventive Example are measured, and the average values and standard deviations are calculated. The results are shown in Table 11:

TABLE 11

| Property | Compar. Ex. D | Inventive Ex. 8 | Inventive Ex. 9 | Inventive Ex. 10 | Inventive Ex. 11 |
|---|---|---|---|---|---|
| Foil adhesion (N/in.) | 6.33 ± 0.78 | 7.45 ± 0.56 | 6.93 ± 0.72 | 5.75 ± 0.55 | 2.75 ± 0.56 |
| RVR | N/A | 0.1 | 0.1 | 0.1 | 0.1 |
| Viscosity ratio | N/A | 2.94 | 3.00 | 3.35 | 2.84 |

The RVR is determined from the melt indices ($I_2$) of the components of Layer A as described above. The viscosity ratio is the ratio of the viscosity at 190° C. and 1000 $s^{-1}$ of the polyethylene component to the viscosity at 190° C. and 1000 $s^{-1}$ of the ethylene/acrylic acid copolymer when measured as described above. Inventive Examples 8-10, in particular, advantageously provide the ability to extrusion coat a metal substrate at temperatures lower than typically used for extrusion coating of LDPE only onto a metal substrate. Inventive Examples 8-10 which incorporate other polyethylene resins also advantageously provide adhesion values comparable to substrates extrusion coated with 100% of the ethylene/acrylic acid copolymer.

The neck-in and draw down speeds for these samples are also measured and the results are shown in Table 12 (in addition to the RVR):

TABLE 12

| Property | Inventive Ex. 8 | Inventive Ex. 9 | Inventive Ex. 10 | Inventive Ex. 11 |
|---|---|---|---|---|
| RVR | 0.1 | 0.1 | 0.1 | 0.1 |
| Viscosity ratio | 2.94 | 3.00 | 3.35 | 2.84 |
| Neck-in (in.) | 4⅝ | 4⅝ | 4⅛ | 4½ |
| Draw down speed (fpm) | 1500+ (no web tear) | 1500+ (no web tear) | 1500+ (no web tear) | 1500+ (no web tear) |
| Reduced draw down speed (fpm) | 1500+ (no web tear) | 1500+ (no web tear) | 1465 | 1500+ (no web tear) |

The neck-in (inches) is measured at a line speed of 440 feet per minute. The draw down speed (feet per minute) is the line speed when a web tear is observed while the screw within the extrusion coater is running at 90 rpm, which results in a flow rate of approximately 250 pounds/hour. The reduced draw down speed (feet per minute) is the line speed when a web tear is observed while the screw within the extrusion coater is running at 45 rpm. The maximum value for draw down speed and reduced draw down speed is 1500 feet per minute, and the reduced draw down speed is only determined if the line speed reaches 1500 feet per minute when the extruder runs at 90 rpm. Table 12 illustrates that Inventive Examples 8-11 exhibit performance properties that would be acceptable for extrusion coating applications.

Example 6

Additional multilayer structures are prepared as shown in Table 13:

TABLE 13

| | Layer A (percentages are weight %) | Layer B (Substrate) |
|---|---|---|
| Comparative Example E | 100% PRIMACOR 3340 | Aluminum substrate |
| Inventive Example 12 | 60% PRIMACOR ™ 3340 40% DOWLEX 2045 | Aluminum substrate |
| Comparative Example F | 100% PRIMACOR 3150 | Aluminum substrate |
| Comparative Example G | 60% PRIMACOR ™ 3150 40% DOWLEX 2045 | Aluminum substrate |

Layer A is coated as a monolayer onto the aluminum substrate as described below.

All of the examples herein are prepared by extrusion coating the polymer layer (Layer A) onto the aluminum substrate (Layer B) utilizing a Black Clawson extrusion coater. Pellets of the polymer used for Layer A in Comparative Examples E and F are fed directly from a box of commercial material. Layer A in Inventive Example 12 and Comparative Example G are prepared by melt blending the prescribed amounts of the two components via a twin screw extruder fitted with a general purpose screw prior to feeding the blend to the extrusion coater. The aluminum substrate is dropped down onto the moving 50 pounds/ream Kraft paper just prior to the chill roll/rubber roll nip where the aluminum substrate is pulled into the nip thus applying Layer A onto the foil side of the aluminum substrate. The resulting flow rate from the die is ~10 pounds/hour of polymer per inch of die opening. A constant air gap of 6 inches is used in fabricating the sample. Each sample consists of a 2 mil thick monolayer of Layer A coated onto the aluminum substrate. The samples are made at a melt temperature of 300° C. and a line speed of 440 feet per minute.

The adhesion of Layer A to the aluminum substrate for each of the samples is determined using a 180 degree peel test based on ASTM standard F904 with a crosshead speed of 10 inches/minute. At least five samples of each Example are measured, and the average values and standard deviations are calculated. The results are shown in Table 14:

TABLE 14

| Property | Comparative Ex. E | Inventive Ex. 12 | Comparative Ex. F | Comparative Ex. G |
|---|---|---|---|---|
| Foil adhesion (N/in.) | 2.95 ± 0.26 | 6.45 ± 2.42 | 3.96 ± 0.72 | 4.29 ± 0.53 |
| RVR | N/A | 0.12 | N/A | 0.09 |
| Viscosity ratio | N/A | 3.14 | N/A | 3.48 |

The RVR is determined from the melt indices ($I_2$) of the components of Layer A as described above. The viscosity ratio is the ratio of the viscosity at 190° C. and 1000 s$^{-1}$ of the polyethylene component to the viscosity at 190° C. and 1000 s$^{-1}$ of the ethylene/acrylic acid copolymer when measured as described above. Inventive Example 12 advantageously provides the ability to extrusion coat a metal substrate at temperatures lower than typically used for extrusion coating of LDPE only onto a metal substrate and is another example of an ethylene/acrylic acid copolymers that can be used in some embodiments of the present invention. In addition, the inclusion of the LLDPE in Comparative Example G (with an ethylene/acrylic acid copolymer having an acid comonomer content of 3.0 weight percent) did not provide the improvement in foil adhesion observed when included in Inventive Example 12 (with an ethylene/acrylic acid copolymer having an acid comonomer content of 6.5 weight percent).

The neck-in and draw down speeds for these samples are also measured and the results are shown in Table 15 (in addition to the RVR):

TABLE 15

| Property | Comparative Ex. E | Inventive Ex. 12 | Comparative Ex. F | Comparative Ex. G |
|---|---|---|---|---|
| RVR | N/A | 0.12 | N/A | 0.09 |
| Viscosity ratio | N/A | 3.14 | N/A | 3.48 |

TABLE 15-continued

| Property | Comparative Ex. E | Inventive Ex. 12 | Comparative Ex. F | Comparative Ex. G |
|---|---|---|---|---|
| Neck-in (in.) | 1¾ | 5⅜ | 2 | 4 |
| Draw down speed (fpm) | 1250 | 1500+ (no web tear) | 1265 | 1100 |
| Reduced draw down speed (fpm) | N/A | 1000 | N/A | N/A |

The neck-in (inches) is measured at a line speed of 440 feet per minute. The draw down speed (feet per minute) is the line speed when a web tear is observed while the screw within the extrusion coater is running at 90 rpm, which results in a flow rate of approximately 250 pounds/hour. The reduced draw down speed (feet per minute) is the line speed when a web tear is observed while the screw within the extrusion coater is running at 45 rpm. The maximum value for draw down speed and reduced draw down speed is 1500 feet per minute, and the reduced draw down speed is only determined if the line speed reaches 1500 feet per minute when the extruder runs at 90 rpm. Table 15 illustrates that Inventive Example 12 exhibits performance properties that would be acceptable for extrusion coating applications. In addition, the inclusion of the LLDPE in Comparative Example G (with an ethylene/acrylic acid copolymer having an acid comonomer content of 3.0 weight percent) resulted in a decrease in draw down speed, whereas with Inventive Example 12, (with an ethylene/acrylic acid copolymer having an acid comonomer content of 6.5 weight percent), the drawn down speed increased.

Example 7

Additional multilayer structures are prepared as shown in Table 16:

TABLE 16

| | Layer A (percentages are weight %) | Layer B (Substrate) |
|---|---|---|
| Comparative Example H | 100% PRIMACOR 3440 | Aluminum substrate 2 |
| Inventive Example 13 | 60% PRIMACOR ™ 3440 40% DOWLEX 2045 | Aluminum substrate 2 |
| Inventive Example 14 | 60% PRIMACOR ™ 3440 40% ELITE 5400G | Aluminum substrate 2 |
| Inventive Example 15 | 60% PRIMACOR ™ 3440 40% DOWLEX 2050B | Aluminum substrate 2 |
| Inventive Example 16 | 60% PRIMACOR ™ 3440 40% DFDA 7047 | Aluminum substrate 2 |

Aluminum substrate 2 used in the above examples is prepared as follows. A 48 gauge PET is laminated to a 0.00035 inch Grade A wettable aluminum foil using a ADCOTE™ 550/Coreactant F mix at a ratio of 100:12. Both ADCOTE™ 550 and Coreactant F are commercially available from The Dow Chemical Company. The adhesive mix is applied at 3 lbs/rm via gravure cylinder using oven temperatures at 150° F. increasing to 180° F. with a nip temperature of 180° F. The laminated structure is cured at 77° F. for a minimum of 7 days before use. The laminated sheet is then cut into 3-4 foot lengths to provide the aluminum substrate. Masking tape is applied to the lead edge of the aluminum substrate. The aluminum substrate is not corona treated. Layer A is coated as a monolayer onto the aluminum substrate as described below.

All of the examples herein are prepared by extrusion coating the polymer layer (Layer A) onto the aluminum substrate (Layer B) utilizing a Black Clawson extrusion coater. Pellets of the polymer used for Layer A in Comparative Example H are fed directly from a box of commercial material. Layer A in Inventive Examples 13-16 are prepared by melt blending the prescribed amounts of the two components via a twin screw extruder fitted with a general purpose screw prior to feeding the blend to the extrusion coater. The aluminum substrate is dropped down onto the moving 50 pounds/ream Kraft paper just prior to the chill roll/rubber roll nip where the aluminum substrate is pulled into the nip thus applying Layer A onto the foil side of the aluminum substrate. The resulting flow rate from the die is ~10 pounds/hour of polymer per inch of die opening. A constant air gap of 6 inches is used in fabricating the sample. Each sample consists of a 1 mil thick monolayer of Layer A coated onto the aluminum substrate. The samples are made at a melt temperature of 300° C. and a line speed of 440 feet per minute.

The hot tack strength of each of the samples is measured in accordance with ASTM F1921, Method A using test instrument from Enepay Corporation. The "hot tack strength" refers to the strength of the heat seal immediately after the sealing operation before the sample has a chance to cool. A sample is cut into 1 inch strips in the machine direction and testing in 10° C. increments with a dwell time of 0.5 seconds. The results are shown in Table 17:

TABLE 17

| | Hot Tack Strength (N) | | | | |
|---|---|---|---|---|---|
| Temperature (° C.) | Comparative Example H | Inventive Example 13 | Inventive Example 14 | Inventive Example 15 | Inventive Example 16 |
| 80 | 0.485 | 0.289 | 0.189 | 0.23 | 0.081 |
| 90 | 2.452 | 1.719 | 1.326 | 0.793 | 0.9 |
| 100 | 11.01 | 14.334 | 7.432 | 7.02 | 5.131 |
| 110 | 13.382 | 21.429 | 19.131 | 20.326 | 19.297 |
| 120 | 10.914 | 15.951 | 16.837 | 18.135 | 18.251 |
| 130 | 8.022 | 12.379 | 10.857 | 12.967 | 8.324 |
| 140 | 6.242 | 7.895 | 7.274 | 9.556 | 7.255 |
| 150 | 5.158 | 6.216 | 6.224 | 5.479 | 5.685 |
| RVR | N/A | 0.1 | 0.1 | 0.095 | 0.1 |
| Viscosity ratio | N/A | 3.00 | 2.94 | 3.01 | 3.20 |

Each of the samples exhibited a peak hot tack strength at 110° C. The peak hot tack strengths of Inventive Examples 13-16 are significantly higher than the peak hot tack strength of Comparative Example H.

Example 8

Additional multilayer structures are prepared as shown in Table 18:

TABLE 18

| | Layer A (percentages are weight %) | Layer B (Substrate) |
|---|---|---|
| Comparative Example I | 100% PRIMACOR 3440 | Oriented Polypropylene |
| Inventive Example 17 | 60% PRIMACOR ™ 3440 40% DOWLEX 2045 | Oriented Polypropylene |
| Inventive Example 18 | 60% PRIMACOR ™ 3440 40% ELITE 5400G | Oriented Polypropylene |

TABLE 18-continued

| | Layer A (percentages are weight %) | Layer B (Substrate) |
|---|---|---|
| Inventive Example 19 | 60% PRIMACOR ™ 3440 40% DOWLEX 2740G | Oriented Polypropylene |
| Inventive Example 20 | 60% PRIMACOR ™ 3440 40% AFFINITY PL 1880G | Oriented Polypropylene |
| Inventive Example 21 | 60% PRIMACOR ™ 3440 40% INFUSE 9107 | Oriented Polypropylene |

The Oriented Polypropylene (oPP) is a multilayer structure having the following composition: 25 pounds BLMG (bleached machine glazed) paper/5.5# LDPE/60 ga metallized oriented polypropylene with a 1.0 watt treatment on the oriented polypropylene. Layer A is coated as a monolayer onto the non-metallized side of the Oriented Polypropylene substrate as described below.

All of the examples herein are prepared by extrusion coating the polymer layer (Layer A) onto the Oriented Polypropylene substrate (Layer B) utilizing a Black Clawson extrusion coater. Pellets of the polymer used for Layer A in Comparative Example I are fed directly from a box of commercial material. Layer A in Inventive Examples 17-20 are prepared by melt blending the prescribed amounts of the two components via a twin screw extruder fitted with a general purpose screw prior to feeding the blend to the extrusion coater. Layer A in Inventive Example 21 is prepared by tumble blending the prescribed amounts of the two components for ~30 minutes prior to feeding the extrusion coater. The Oriented Polypropylene substrate is dropped down onto the moving 50 pounds/ream Kraft paper just prior to the chill roll/rubber roll nip where the substrate is pulled into the nip thus applying Layer A onto the substrate. The resulting flow rate from the die is ~10 pounds/hour of polymer per inch of die opening. A constant air gap of 6 inches is used in fabricating the sample. Each sample consists of a 2 mil thick monolayer of Layer A coated onto the Oriented Polypropylene Substrate. The samples are made at a melt temperature of 300° C. and a line speed of 440 feet per minute.

The adhesion of Layer A to the Oriented Polypropylene substrate for each of the samples is determined using a 180 degree peel test based on ASTM standard F904 with a crosshead speed of 10 inches/minute. At least five samples of each Example are measured, and the average values and standard deviations are calculated. The results are shown in Table 19:

TABLE 19

| Property | Comparative Example I | Inventive Ex. 17 | Inventive Ex. 18 | Inventive Ex. 19 | Inventive Ex. 20 | Inventive Ex. 21 |
|---|---|---|---|---|---|---|
| oPP adhesion (N/in.) | 0.59 ± 0.09 | 0.58 ± 0.09 | 1.42 ± 0.19 | 0.85 ± 0.1 | 2.18 ± 0.25 | 1.24 ± 0.28 |
| RVR | N/A | 0.1 | 0.1 | 0.1 | 0.1 | 0.1 |
| Viscosity ratio | N/A | 3.00 | 2.94 | 3.00 | 3.35 | 2.84 |

The RVR is determined from the melt indices ($I_2$) of the components of Layer A as described above. The viscosity ratio is the ratio of the viscosity at 190° C. and 1000 s$^{-1}$ of the polyethylene component to the viscosity at 190° C. and 1000 s$^{-1}$ of the ethylene/acrylic acid copolymer when measured as described above. Inventive Examples 17-21 provide comparable or improved adhesion values to the Oriented Polypropylene substrate as compared to 100% of an ethylene/acrylic acid copolymer (Comparative Example I).

Example 9

Additional multilayer structures are prepared as shown in Table 20:

TABLE 20

| | Layer A (percentages are weight %) | Layer B (Substrate) |
|---|---|---|
| Comparative Example J | 100% PRIMACOR 3440 | oPA |
| Inventive Example 22 | 60% PRIMACOR ™ 3440 40% DOWLEX 2045 | oPA |
| Inventive Example 23 | 60% PRIMACOR ™ 3440 40% ELITE 5400G | oPA |
| Inventive Example 24 | 60% PRIMACOR ™ 3440 40% DOWLEX 2740G | oPA |
| Inventive Example 25 | 60% PRIMACOR ™ 3440 40% AFFINITY PL 1880G | oPA |
| Inventive Example 26 | 60% PRIMACOR ™ 3440 40% INFUSE 9107 | oPA |

The substrate in these Examples is an Oriented Polyamide (oPA) film. Layer A is coated as a monolayer onto the Oriented Polyamide substrate as described below.

All of the examples herein are prepared by extrusion coating the polymer layer (Layer A) onto the Oriented Polyamide substrate (Layer B) utilizing a Black Clawson extrusion coater. Pellets of the polymer used for Layer A in Comparative Example J are fed directly from a box of commercial material. Layer A in Inventive Examples 22-25 are prepared by melt blending the prescribed amounts of the two components via a twin screw extruder fitted with a general purpose screw prior to feeding the blend to the extrusion coater. Layer A in Inventive Example 26 is prepared by tumble blending the prescribed amounts of the two components for ~30 minutes prior to feeding the extrusion coater. The Oriented Polyamide substrate is dropped down onto the moving 50 pounds/ream Kraft paper just prior to the chill roll/rubber roll nip where the substrate is pulled into the nip thus applying Layer A onto the substrate. The resulting flow rate from the die is ~10 pounds/hour of polymer per inch of die opening. A constant air gap of 6 inches is used in fabricating the sample. Each sample consists of a 2 mil thick monolayer of Layer A coated onto the Oriented Polyamide Substrate. The samples are made at a melt temperature of 300° C. and a line speed of 440 feet per minute.

The adhesion of Layer A to the Oriented Polyamide substrate for each of the samples is determined using a 180 degree peel test based on ASTM standard F904 with a crosshead speed of 10 inches/minute. At least five samples of each Example are measured, and the average values and standard deviations are calculated. The results are shown in Table 21:

TABLE 21

| Property | Comparative Example J | Inventive Ex. 22 | Inventive Ex. 23 | Inventive Ex. 24 | Inventive Ex. 25 | Inventive Ex. 26 |
|---|---|---|---|---|---|---|
| oPA adhesion (N/in.) | 0.21 ± 0.03 | 0.53 ± 0.09 | 0.57 ± 0.13 | 0.43 ± 0.03 | 0.71 ± 0.05 | 0.68 ± 0.13 |
| RVR | N/A | 0.1 | 0.1 | 0.1 | 0.1 | 0.1 |
| Viscosity ratio | N/A | 3.00 | 2.94 | 3.00 | 3.35 | 2.84 |

The RVR is determined from the melt indices ($I_2$) of the components of Layer A as described above. The viscosity ratio is the ratio of the viscosity at 190° C. and 1000 s$^{-1}$ of the polyethylene component to the viscosity at 190° C. and 1000 s$^{-1}$ of the ethylene/acrylic acid copolymer when measured as described above. Inventive Examples 22-26 provide improved adhesion values to the Oriented Polyamide substrate as compared to 100% of an ethylene/acrylic acid copolymer (Comparative Example J).

We claim:

1. A polymer blend comprising:
    a copolymer comprising ethylene and at least one of acrylic acid and methacrylic acid having an acid content greater than 6 and up to 12 weight percent based on the weight of the copolymer and having a melt index ($I_2$) of 5 to 30 g/10 minutes, wherein the total amount of ethylene acrylic acid copolymer and ethylene methacrylic acid copolymer comprises at least 55 weight percent of the blend based on the total weight of the blend; and
    a polyolefin having a density of 0.870 g/cm$^3$ to 0.955 g/cm$^3$ more and having a melt index ($I_2$) of 2 g/10 minutes or less, wherein the polyolefin comprises 30 to 45 weight percent of the blend based on the total weight of the blend, and wherein the relative viscosity ratio of the polyolefin to the ethylene/(meth)acrylic acid copolymer is <0.15 and wherein the viscosity ratio of polyolefin to the ethylene/(meth)acrylic acid copolymer is greater than 1.5 and less than 5 when the viscosity of each component is determined at a temperature of 190° C. at an applied shear rate of 1000 s$^{-1}$.

2. The polymer blend of claim 1, wherein the polyolefin comprises linear low density polyethylene, low density polyethylene, high density polyethylene, polypropylene, or a combination thereof.

3. The polymer blend of claim 1, wherein the polyolefin comprises low density polyethylene or linear low density polyethylene.

4. The polymer blend of claim 1, further comprising an inorganic filler, wherein the inorganic filler comprises calcium carbonate, magnesium carbonate, or a combination thereof.

5. The polymer blend of claim 4, wherein the inorganic filler comprises up to 50 weight percent of the blend based on the total weight of the blend.

6. A multilayer structure comprising at least two layers, each layer having opposing facial surfaces, wherein:
    Layer A comprises the polymer blend of claim 1; and
    Layer B comprises a substrate, wherein a top facial surface of Layer B is in adhering contact with a bottom facial surface of Layer A.

7. The multilayer structure of claim 6, wherein the substrate comprises a metal foil, a metallized film, a woven mat, a nonwoven mat, or a scrim.

8. The multilayer structure of claim 6, further comprising Layer C, wherein a top facial surface of Layer A is in adhering contact with a bottom facial surface of Layer C, wherein Layer C comprises a polyolefin.

9. The multilayer structure of claim 6, wherein the adhesion of Layer A to Layer B is at least 3 N/inch when measured using a 180 degree peel test based on ASTM F904 with a crosshead speed of 3 inches/minute.

10. A polymer blend comprising:
    a copolymer comprising ethylene and at least one of acrylic acid and methacrylic acid having an acid content greater than 6 and up to 12 weight percent based on the weight of the copolymer and having a melt index ($I_2$) of 5 to 30 g/10 minutes, wherein the total amount of ethylene acrylic acid copolymer and ethylene methacrylic acid copolymer comprises at least 55 to 75 weight percent of the blend based on the total weight of the blend; and
    a polyethylene comprising low density polyethylene or linear low density polyethylene and having a melt index ($I_2$) of 2 g/10 minutes or less, wherein the polyethylene comprises 30 to 45 weight percent of the blend based on the total weight of the blend, wherein the relative viscosity ratio of the polyethylene to the ethylene/(meth)acrylic acid copolymer is <0.15 and wherein the viscosity ratio of polyethylene to the ethylene/(meth)acrylic acid copolymer is greater than 1.5 and less than 5 when the viscosity of each component is determined at a temperature of 190° C. at an applied shear rate of 1000 s$^{-1}$.

11. A polymer blend comprising:
    a copolymer comprising ethylene and acrylic acid having an acid content greater than 6 and up to 12 weight percent based on the weight of the copolymer and having a melt index ($I_2$) of 5 to 20 g/10 minutes, wherein the total amount of ethylene acrylic acid copolymer comprises at least 55 weight percent of the blend based on the total weight of the blend; and
    a polyethylene comprising low density polyethylene or linear low density polyethylene and having a melt index ($I_2$) of 2 g/10 minutes or less, wherein the polyethylene comprises 30 to 45 weight percent of the blend based on the total weight of the blend, wherein the relative viscosity ratio of the polyethylene to the ethylene/acrylic acid copolymer is <0.15, and wherein the viscosity ratio of polyethylene to the ethylene/acrylic acid copolymer is greater than 1.5 and less than 5 when the viscosity of each component is determined at a temperature of 190° C. at an applied shear rate of 1000 s$^{-1}$.

12. The polymer blend of claim 11, wherein the total amount of ethylene acrylic acid copolymer comprises 55 to 65 weight percent of the blend based on the total weight of the blend; and wherein the polyethylene comprises 35 to 45 weight percent of the blend based on the total weight of the blend and has a density of greater than 0.900 g/cm$^3$ to 0.955 g/cm$^3$.

* * * * *